US00RE34360E

United States Patent [19]

Carlson et al.

[11] E Patent Number: Re. 34,360

[45] Reissued Date of Patent: Aug. 31, 1993

[54] BI-FOLD DOOR CONSTRUCTION

[75] Inventors: Dennis L. Carlson; Richard D. Cultice, Jr., both of Waukesha, Wis.

[73] Assignee: Kelley Company, Inc., Milwaukee, Wis.

[21] Appl. No.: 680,172

[22] Filed: Apr. 3, 1991

Related U.S. Patent Documents

Reissue of:

[64] Patent No.: 4,957,600
Issued: Sep. 18, 1990
Appl. No.: 371,265
Filed: Jun. 26, 1989

[51] Int. Cl.[5] ..... E05D 15/26

[52] U.S. Cl. ..... 160/199; 160/118

[58] Field of Search ..... 160/199, 196.1, 201, 160/206, 213, 117, 118, 119, 40, 331, 126

[56] References Cited

U.S. PATENT DOCUMENTS

| | | | |
|---|---|---|---|
| 1,626,764 | 5/1927 | Thorne | 160/199 |
| 3,073,381 | 1/1963 | Burmeister | 160/199 |
| 3,073,383 | 1/1963 | Crick | 160/199 |
| 3,302,690 | 2/1967 | Hurd | 160/40 |
| 4,296,791 | 10/1981 | Chaumat et al. | 160/206 |
| 4,427,049 | 1/1984 | Belanger et al. | 160/199 |
| 4,432,406 | 2/1984 | Belanger et al. | 160/199 |
| 4,574,862 | 3/1986 | Rejc | 160/199 |
| 4,770,224 | 9/1988 | Dubbelman | 160/331 |
| 4,852,628 | 8/1989 | Klein | 160/199 |
| 4,887,659 | 12/1989 | West | 160/199 |
| 4,961,454 | 10/1990 | Reilly et al. | 160/199 X |
| 5,025,846 | 6/1991 | West | 160/199 |

*Primary Examiner*—David M. Purol
*Attorney, Agent, or Firm*—Andrus, Sceales, Starke & Sawall

[57] ABSTRACT

An industrial door comprising a pair of side panels and a pair of central panels with each central panel having approximately twice the horizontal width of a side panel. The upper end of one side edge of each side panel is pivoted to the jamb of a doorway, while the upper end of the opposite side edge of each said panel is pivoted to the adjacent side edge of a center panel. A track is located above the doorway and a pair of trolleys are mounted for movement on the track. Each trolley includes a vertical pivot shaft which is connected to a center panel at a location midway of the width of the panel. A drive mechanism is mounted in the header and includes an endless cable which is connected through a torque arm to the shaft of each trolley. Operation of a reversible drive mechanism in one direction will operate through the cable to move the panels to a closed position where they enclose the doorway, while operation of the drive mechanism in the opposite direction will move the panels to the open or folded position. Flexible weather strips can be connected between the side edge of each said panel and the door jamb, and similarly flexible weather strips can interconnect the adjacent side edges of the side panels and center panels. To ensure that the panels fold in the proper manner, resilient shock cords interconnect the adjacent side edges of the side and center panels.

13 Claims, 5 Drawing Sheets

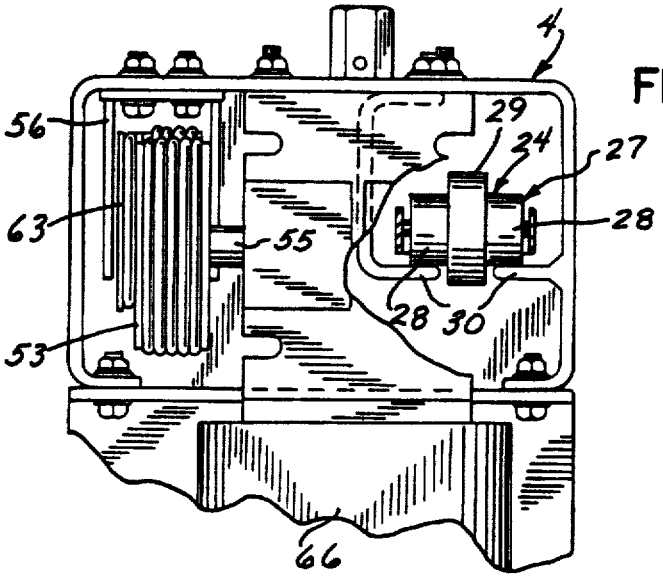
FIG. 4
FIG. 5
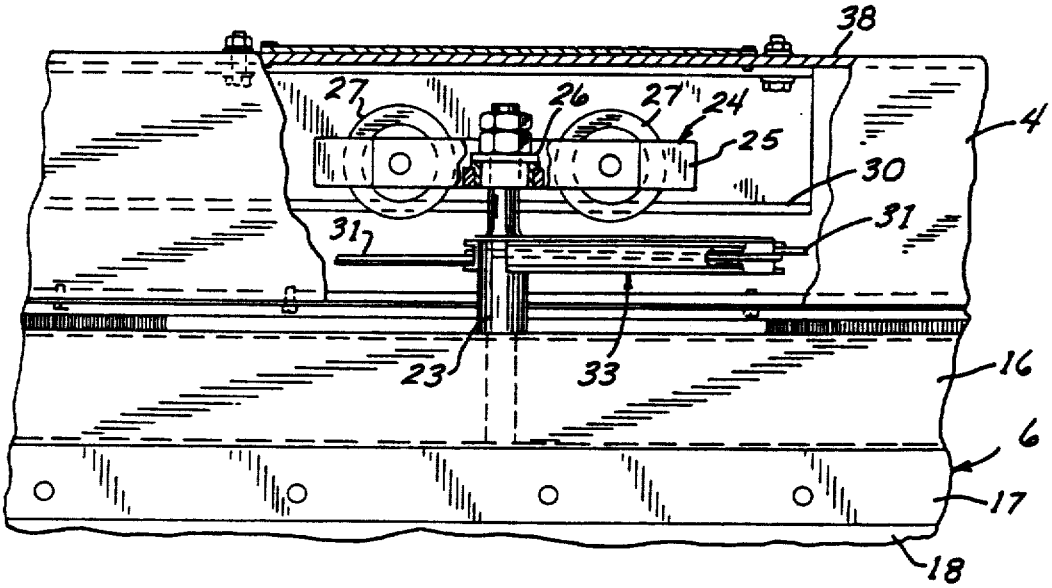
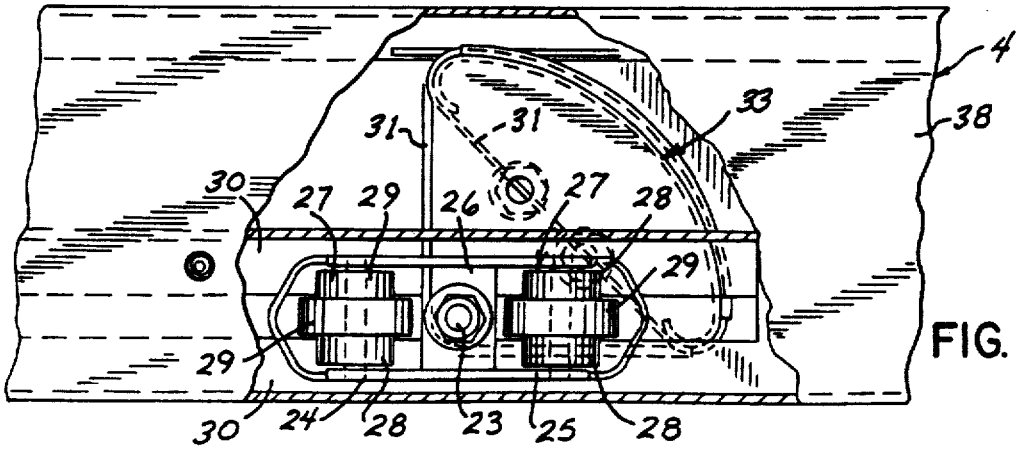
FIG. 6

BI-FOLD DOOR CONSTRUCTION

Matter enclosed in heavy brackets [ ] appears in the original patent but forms no part of this reissue specification; matter printed in italics indicates the additions made by reissue.

BACKGROUND OF THE INVENTION

Industrial doors are frequently used to separate different areas of a building which may be operating under different temperature or humidity conditions. In addition, industrial doors can also be employed to provide noise control between two areas of a plant. One common form of industrial door is a rollup door, in which a flexible curtain is coiled on a drum that is mounted above the doorway. Through power operation of the drum, the curtain can be unwound and moved downwardly to a closed position.

Another form of industrial door is a folding door, such as the type described in U.S. Pat. No. 4,770,224. As disclosed in that patent, the door consists of a pair of flexible curtains, the upper end of each curtain being suspended from a series of trolleys that ride on a guide track which is mounted above the doorway. An endless, power operated cable is connected to the various trolleys, and the cable is reeved in a manner such that movement of the cable in one direction will move the curtains to a closed position, while operation of the drive in the opposite direction will move the curtains to a folded, open position.

SUMMARY OF THE INVENTION

The invention is directed to a bi-fold industrial door that includes a pair of side panels and a pair of center panels, each center panel having a horizontal width approximately twice the horizontal width of a side panel.

The upper end of one side edge of each side panel is pivoted to the jamb of the doorway, while the upper end of the opposite side edge of each side panel is pivoted to the adjacent side edge of a central panel.

A track is located in a header mounted above the doorway and a pair of trolleys are mounted to ride on the track. Each trolley includes a vertical pivot shaft, which is secured to the upper horizontal arm of a central panel. Housed within the header is a drive mechanism that includes an endless cable which is operably connected to each trolley. With this construction, operation of the drive mechanism in one direction will operate via the cable to move the panels to the extended or closed position, while operation of the drive mechanism in the opposite direction will move the panels to the open or folded position, where the central panel is disposed generally parallel to the side panel and is in flatwise relation to the jamb of the doorway.

As a feature of the invention, a quadrant-shaped torque arm is secured to the pivot shaft of each trolley and the cable is connected to each torque arm at a location spaced from the pivot shaft. Due to the offset location of the connection with relation to the pivot shaft, a mechanical advantage is achieved which aids in pivoting the panels between the folded and extended positions.

In a preferred form of the invention, the side and center panels are formed of relatively rigid, transparent plastic sheeting, such as polyvinylchloride, and due to the transparency, traffic is visible on the opposite side of the door when in the closed position.

To provide a weather seal, a flexible weather strip interconnects the side edge of each side panel with the building adjacent the door jamb, and a second flexible weather strip interconnects the adjacent side edges of the side panels and center panels.

To insure that the panels fold properly under high wind conditions, a resilient member, which can take the form of a shock cord, interconnects adjacent side edge portions of the side and center panels.

In one form of the invention, one center panel has a greater horizontal width than the other center panel, which results in the center panel of shorter width being moved to the closed position before the center panel of greater width. This lag insures that the adjacent side edges of the center panels will be properly overlapped in the closed position. Because of the lag, a tensioning mechanism is incorporated with the drive system to take up the slack in the cable after the center panel of shorter width has reached its end position and the center panel of greater width continues to move to its end position.

The door of the invention can be moved rapidly between the closed and open position, and in the open position, the center panels are folded flat against the jambs of the doorway, so that the folded door provides a minimum obstruction to traffic.

The door is of rugged construction and can stand substantial impact, such as may be caused by a fork lift truck accidentally coming in contact with the door panels. As the door panels are mounted from their upper edge, any accidental contact with an external force will not damage the mounting mechanism.

The construction of the invention also provides an effective weather seal between the side panels and the building, as well as between the side panels and the center panels. The weather strips are not permanently attached to the door panels and if the door is accidentally exposed to an external force or impact, the weather strips can disengage from the door panels to prevent damage and yet can be readily reconnected.

The door is of simple construction, including only a pair of side panels and a pair of center panels with only a single trolley utilized for each center panel. This substantially reduces the overall cost of the door as compared to conventional folding type doors and correspondingly reduces the maintenance costs.

Other objects and advantages will appear during the course of the following description.

DESCRIPTION OF THE DRAWINGS

The drawings illustrate the best mode presently contemplated of carrying out the invention.

In the DRAWINGS:

FIG. 4 is a section taken along line 4—4 of FIG. 3;

FIG. 5 is an enlarged fragmentary front elevation showing the attachment of the trolley and torque arm to the center panel;

FIG. 6 is a top view of the construction shown in FIG. 5;

DESCRIPTION OF THE ILLUSTRATED EMBODIMENT

The drawings illustrate a bi-fold door 1 that is adapted to enclose a doorway 2 in a commercial or industrial building 3. Generally, the door 1 is employed to separate two areas of a building which may have different temperature or humidity conditions, or the door can also be used to reduce the noise level between adjacent areas of a building.

Figure 2:
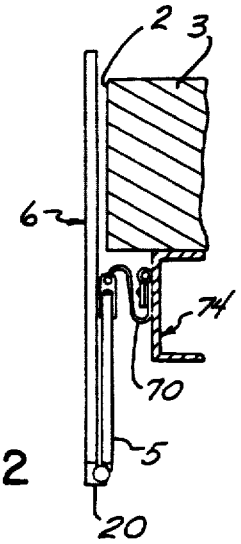
FIG. 2 is a fragmentary horizontal section showing a side panel and center panel in the open or folded position.

Door 1 includes a header 4 which is mounted on building 3 above doorway 2 and a pair of side panels 5 and center panels 6 extend downwardly from header 4 and are adapted to be moved between a closed position, where panels 5 and 6 extend across doorway 2, to an open position, where the panels 5 and 6 are folded adjacent the jamb of the doorway, as shown in FIG. 2.

Figure 3:
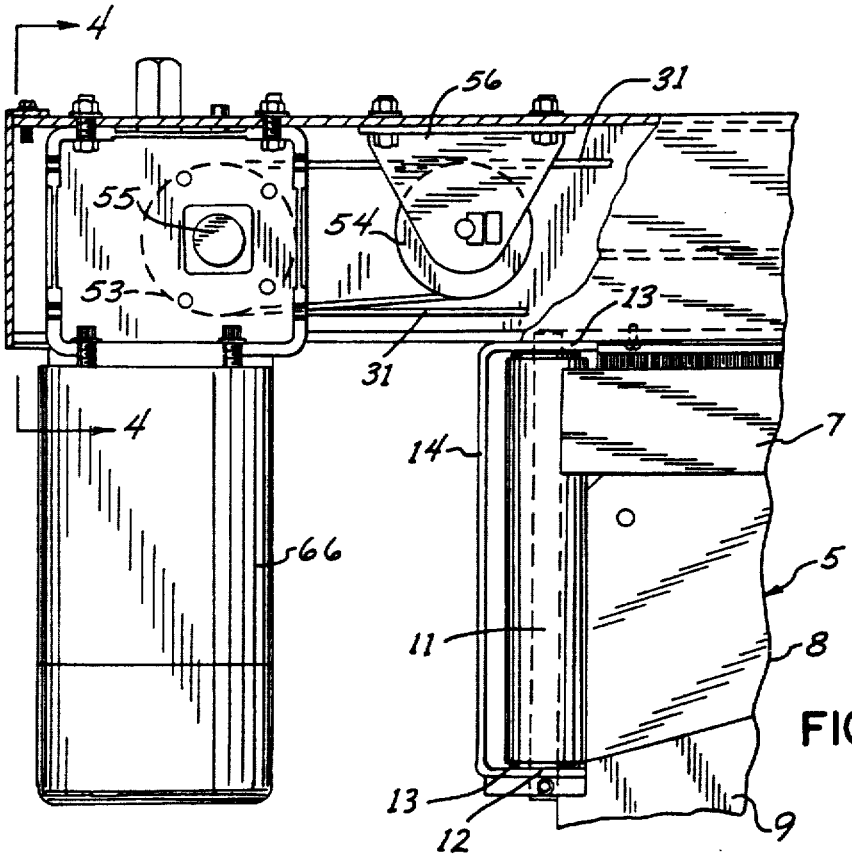
FIG. 3 is an enlarged fragmentary front elevation of the header and side panel.
Figures 7, 8, 9:
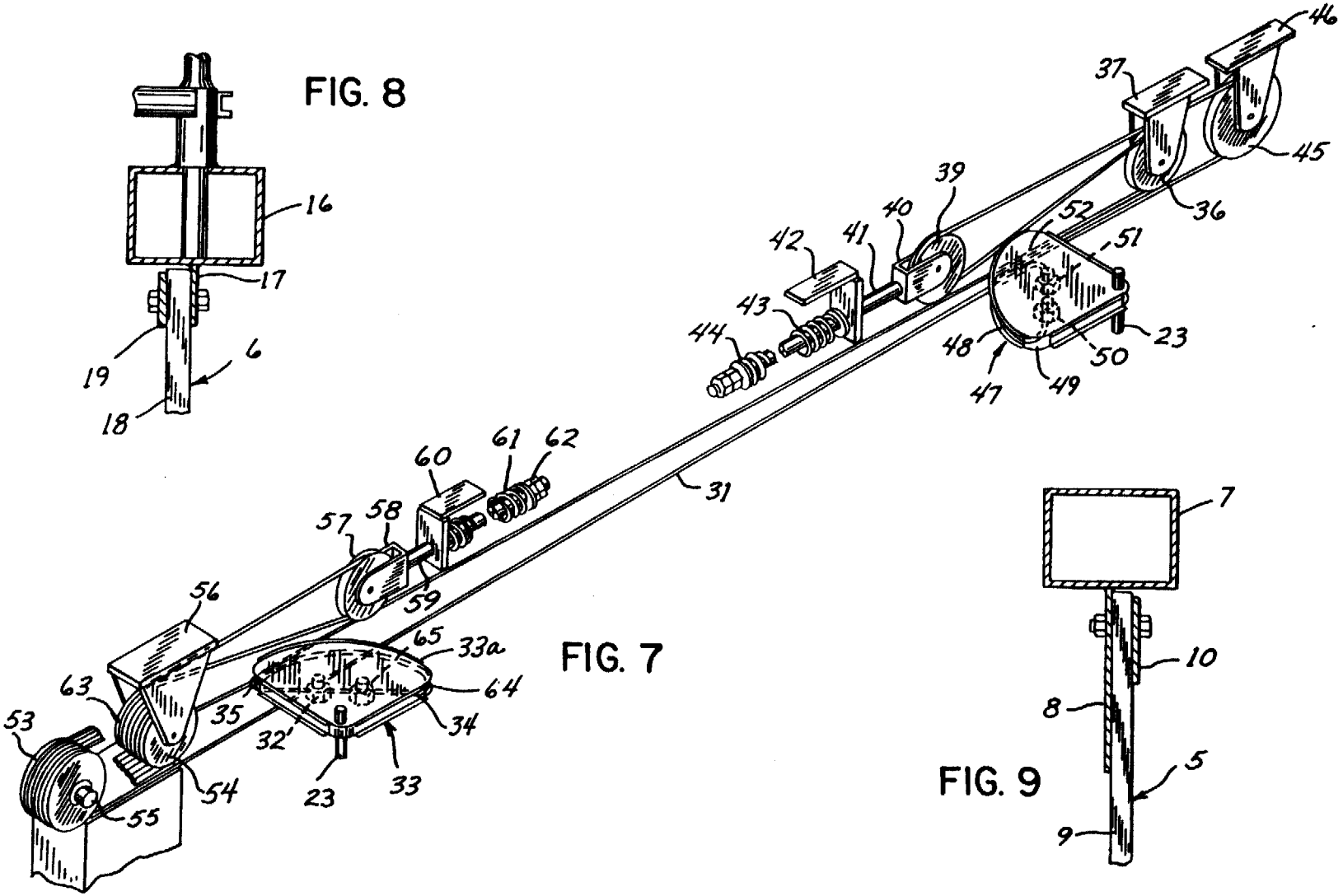
FIG. 7 is a schematic drawing of the drive mechanism.
FIG. 8 is a fragmentary vertical section showing the of the side panel.
FIG. 9 is a fragmentary vertical section of a center panel showing the attachment of the transparent sheet.

As best shown in FIG. 3 each side panel 5 includes an upper generally horizontal arm 7 that is rectangular in cross section. Plate 8 extends downwardly from the lower surface of arm 7 and the upper edge of a transparent sheet 9 of plastic material, formed of polyvinylchloride or the like, is attached to the plate 8 through a retaining strip 10, as shown in FIG. 9. In this manner, the transparent sheet 9 is suspended from arm 7.

The end of arm 7 is welded to a vertical tube 11 and tube 11 is journalled for rotation about a vertical shaft 12 which is secured between the horizontal flanges 13 of a channel 14, as shown in FIG. 3. The upper flange 13 of channel 14 is secured to the undersurface of header 4. With this construction, side panel 5 can be pivoted about the axis of the shaft 12 between the extended or closed position and the folded or open position.

Figure 11:
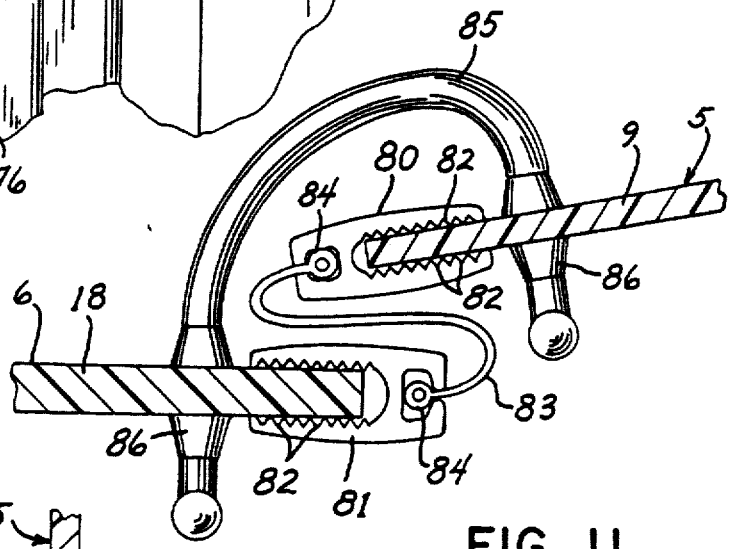
FIG. 11 is a horizontal section showing the weatherstrip between a side panel and center panel.
Figure 12:
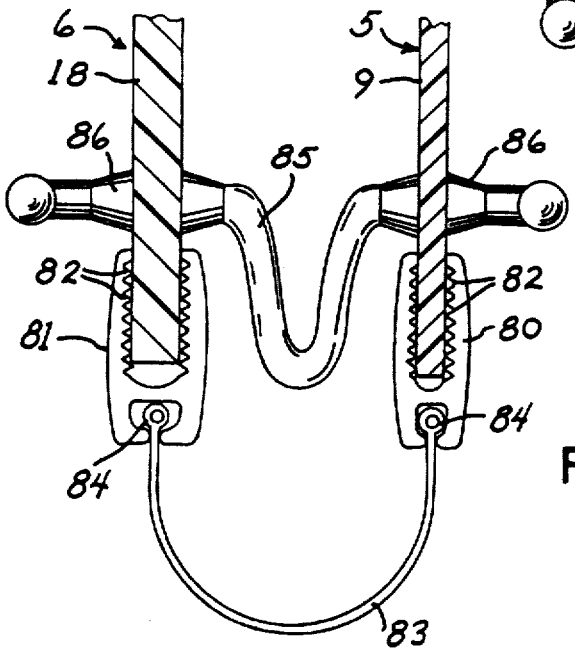
FIG. 12 is a view similar to FIG. 11 showing the panels in the open or folded position.

Each center panel 6, as shown in FIGS. 5 and 6, includes an upper horizontal arm 16 which has a generally rectangular cross-section and a plate 17 extends downwardly from the lower surface of arm 16. A transparent sheet 18 of plastic material, similar to sheet 9, is secured to the plate 17 through a strip 19 so that the sheet 18 is suspended from horizontal arm 16, as seen in FIG. 8. In practice, sheet 18 may have a greater thickness than sheet 5, as seen in FIGS. 11 and 12.

Figure 13:
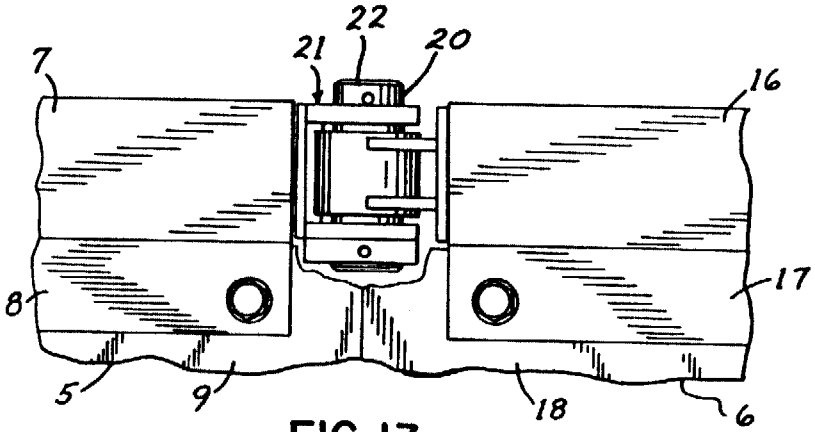
FIG. 13 is a fragmentary front elevation showing the knuckle hinge attachment of a side panel and center panel.

The adjacent side edges of side panels 5 and center panel 6 are pivotally connected together. The pivotal connection takes the form of a knuckle hinge 20 which extends outwardly from the end of arm 16 of center panel 6 and is connected to a clevis 21 on the end of arm 7 of side panel 5 by vertical pin 22, as shown in FIG. 13. With this construction, the side panels 5 and center panels 6 can be pivoted relative to each other from the extended closed position to the folded open position. Knuckle hinge 20 is designed to limit the pivotal movement of panels 5 and 6 and prevent the panels from pivoting beyond the substantially straight line or on-center position.

As shown in FIG. 2, each center panel 6 has a greater horizontal width than the side panel 5, and preferably twice the width of the side panel 5. In the folded condition, each center panel 6 will be located adjacent the jamb of doorway 2.

A pivot shaft 23 extends upwardly from the arm 16 of each center panel and is located centrally of the width of the center panel, and a trolley 24 is mounted for rotation on the upper end of the shaft 23, as seen in FIG. 5.

As best shown in FIGS. 5 and 6, each trolley 24 includes a generally rectangular cage 25 and cross bar 26 extends centrally across the cage. Bar 26 is provided with a central opening and the upper end of shaft 23 is journalled within the opening in cross bar 26.

Trolley 24 includes a pair of wheels or rollers 27 and each wheel is formed with an enlarged central portion 28 and a pair of side portions 29 which ride on tracks 30 that project inwardly from the sidewalls of header 4. The enlarged central portion 28 of each wheel 27 is located between the tracks and serves to retain the wheels on the tracks. As the panels 5 and 6 are moved from the closed to the open position, trolleys 24 will ride on the tracks 30 and the shafts 23 and arms 16 will pivot relative to the trolleys as the center panels 6 are moved from the extended to the folded positions.

A cable drive mechanism is employed to move the panels from the closed to open position and includes a cable 31 which is mounted in endless form within header 4 and is connected to the shafts 23 of trolleys 24.

As shown in FIG. 7, one end of cable 31 is dead ended on a stud 32 that extends downwardly from torque arm 33. Torque arm 33 is secured to shaft 23 and is mounted beneath trolley 24 as shown in FIG. 5.

Torque arm 33 is in the shape of quadrant having a generally curved outer surface 33A and rounded corners. The peripheral edge of the torque arm is formed with a groove 34 which receives cable 31.

Cable 31, being dead ended on stud 32, then passes around corner 35 of torque arm 33, then travels to the opposite end of the header and is trained around pulley 36 which is supported through bracket 37 from the upper surface 38 of header 4.

Cable 31 then passes in the opposite direction around a tensioning pulley 39 which is secured via a bifurcated bracket 40 to horizontal rod 41. Rod 41 passes freely through the vertical leg of an angle bracket 42, the horizontal leg of which is attached to upper surface 38 of header 4. Coil spring 43 is interposed between the vertical leg of bracket 42 and a stop 44 which is threaded on the outer end of rod 41. With this construction the force of spring 43 will urge the pulley 39 in a direction toward bracket 42 to maintain tension on the cable.

Cable 31 then travels to the end of the header and passes around end pulley 45 which is rotatably supported through bracket 46 from upper surface 38 of header 4 and the cable is then secured to torque arm 47 which is secured to the other center panel 6. Torque arm 47 is similar in construction to torque arm 33 and is provided with a peripheral groove 48 which receives cable 31. as shown in FIG. 7. Cable 31 then passes around corner 49 and is then secure to a pair of studs 50 and 51 which are mounted on the lower surface of torque arm 47. The manner of connection of the cable to the torque arm is not critical and as illustrated the cable passes through an opening in each stud and by threading a nut on the stud the cable will be retained or secured to the torque arm.

Cable 31 then passes around corner 52 of torque arm 47 and then extends to the opposite edge of the header passing under the torque arm 33. Cable 31 is reeved about a multiple-groove drive sheave 53 and a multiple-groove idler sheave 54 which are located at the end of the header. Reeving about the multiple groove sheaves provides additional surface contact to increase the driving force. The drive sheave 53 is mounted on a drive shaft 55, while the idler sheave 54 is journalled on a bracket 56 that is secured to the upper surface 38 of header 4.

After passing around the drive sheaves 53, the cable travels to a tensioning pulley 57 which is mounted through bracket 58 to the end of a horizontal rod 59. Rod 59 extends freely through the vertical leg of an angle bracket 60, the horizontal leg of which is attached to surface 38 of header 4.

Coil spring 61 extends between the vertical leg of bracket 60 and a stop nut 62 threaded on the end of rod 59. The force of the spring will thus urge the tensioning pulley 57 in a direction away from the sheaves 54 to apply tension to cable 31.

Cable 31 travels from tensioning pulley 57 to an idler pulley 63 which is mounted along side the idler sheaves 55 and is supported from bracket 56. Cable 31 then travels back to the torque arm 33 and passes around corner 64 of the torque arm and is dead ended on stud 65.

With this construction, cable 31 is in effect in endless form and a reversible motor 66 acting through a suitable speed reducing mechanism, not shown, drives shaft 55 to move the cable in opposite directions. For example, operation of motor 66 in one direction will cause cable 31 to pivot the torque arms 33 and 47 in opposite direction about the respective shafts 23 and thereby move the panels 5 and 6 from the closed to the open, folded position. Operation of the motor 66 in the opposite direction will cause the cable to pivot the torque arms 33, 47 in a direction toward each other to thereby move the panels to the closed condition. The connection of the cable 31 to the torque arms 33, 47 is spaced or offset from the axis of the pivot shaft 23 and this offset relation provides a mechanical advantage to aid in pivoting the central panels between the extended and folded position.

In order to insure that the center panels 6 fold properly at the center of the door, one of the center panels is provided with a greater horizontal width than the other. The center panel with the smaller horizontal width will move to the extended or closed position more quickly than the wider center panel, and thus the tensioning pulleys 39 and 57 will take up the slack in the cable due to this lag of the wider center panel moving to the closed position. More specifically, when the center panel 6 of smaller width is fully extended, the cable will slacken as the center panel of greater width is continuing to move to its extended position. Thus the tensioning mechanism will take up this slack due to the lag in the wider center panel moving to the extended position.

Figure 10:
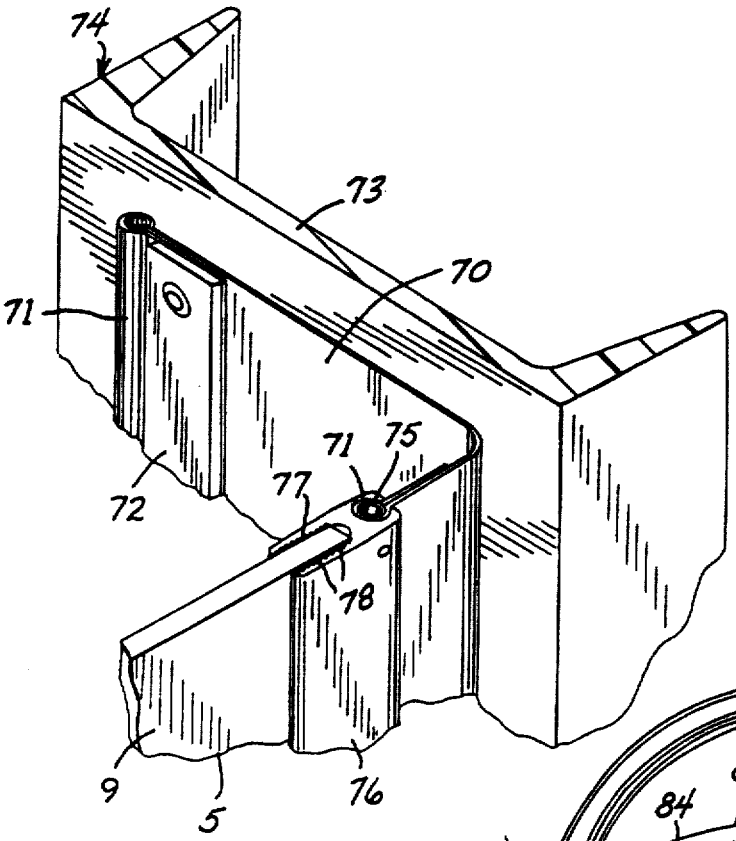
FIG. 10 is a perspective view showing the weatherstrip between the side panel and building.

It is contemplated that the outer side edge of each side panel 5 can be sealed to the jamb of the doorway 2 to provide a weather seal. As shown in FIGS. 2 and 10, a weather strip 70 connects the side edge of each side panel 5 with the doorway 2 and weather strip 70 extends from the channel 14 to a location adjacent the floor.

Strip 70 is provided with beads 71 along its side edges and one end of strip 70 is secured via a plate 72 to the web 73 of a channel 74 that extends outwardly from the building 3. The bead 71 at the opposite end of the strip is received within a longitudinal groove 75 formed in a connector strip 76, as shown in FIG. 10. The edge of sheet 9 is mounted within a groove 77 in the opposite edge of strip 76. As shown in FIG. 10, groove 77 can be provided with a series of serrations or teeth 78 which will retain the sheet 9 within groove 77.

Weather strip 70 serves to seal the gap between the side edge of the side panel 5 and the building 3, as illustrated in FIG. 2.

The adjacent side edges of side panels 5 and center panels 6 can also be sealed, as illustrated in FIGS. 11 and 12. The weather seal assembly includes a pair of connector strips 80 and 81 which are similar in construction to connector strips 76 and extend the full height from the floor to arms 7 and 16 of panels 5 and 6, respectively. The side edge of the side panel 5 is received within the longitudinal groove in strip 80 and similarly the side edge of center panel 6 is received within the longitudinal groove in connector strip 81. Teeth or serrations 82 border the grooves in strips 80 and 81.

A flexible weather strip 83, similar in construction to weatherstrip 70, interconnects the two connector strips 80 and 81. As shown in FIGS. 11 and 12 the ends of weather strip 83 are provided with beads 84 which are received within grooves in the respective connectors 80 and 81. The flexible nature of strip 83 enables the strip to follow the movement of the panels 5 and 6 as they are moved between the closed and opened positions.

A mechanism is also included to ensure that the panels 5 and 6 will fold in the proper manner. This mechanism, as illustrated in FIGS. 11 and 12, takes the form of a plurality of rubber or resilient shock cords 85 which are spaced along the adjacent side edges of the panels 5 and 6. Opposite ends of each shock chord 85 are provided with enlarged tapered heads 86 which are inserted through openings in the side panel 5 and center panel 6, respectively. The resilient nature of the shock chords will ensure that the side and center panels will fold in the proper manner, particularly under wind conditions.

Figure 14:
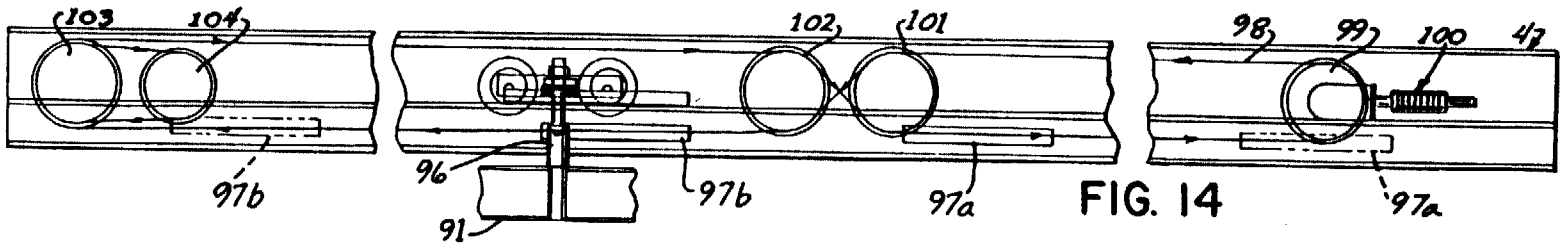
FIG. 14 is schematic front elevation of the drive mechanism of a second embodiment of the invention.
Figure 15:
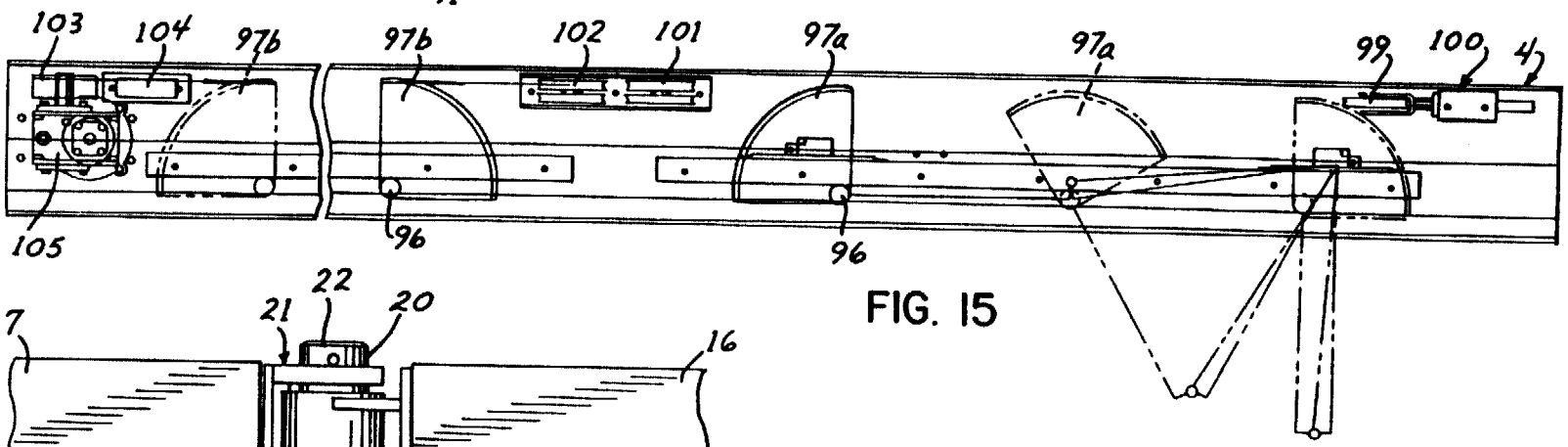
FIG. 15 is a top view of the construction shown in FIG. 14.
Figure 16:
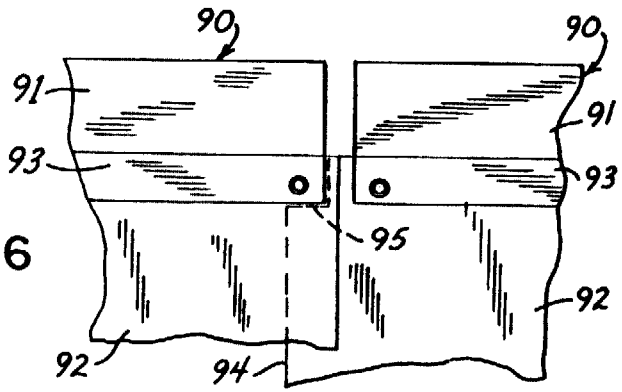
FIG. 16 is a fragmentary front elevation of the center door panels in the closed position.

FIGS. 14–16 illustrate a modified form of the invention in which the two center panels have substantially the same horizontal width and a modified drive mechanism is incorporated.

The door as illustrated in FIGS. 14–16 includes a pair of side panels and a pair of center panels, both of which are similar in construction and function to side panels 5 and center panels 6, previously described. The outer side edge of each side panel is mounted for pivotal movement with respect to building 3 in the manner previously described.

Each center panel 90 includes a horizontal support arm 91 and a sheet of transparent plastic material 92 is attached by bolts to a plate 93 which projects downwardly from the undersurface of arm 91. A retaining strip, not shown, is located on the opposite side of sheet 97 from plate 98.

The vertical side edges of the sheets 92 of center panels 90 slightly overlap when the center panels are in the closed position, as shown in FIG. 16. The vertical side edge 94 of one sheet 92 is provided with a notch 95 which receives the end of the connecting plate 93 of the other center panel 90. The two transparent sheets 92 are offset to provide the overlap at the center of the door.

A pivot shaft 96 extends upwardly from the support arm 91 of each center panel 90 and the shaft 96 is located centrally of the length of each arm. Torque arm 97, similar to torque arms 33 and 47, is mounted on each shaft 96, and a trolley is journalled on the upper end of the pivot shaft 96 in the manner previously described. As the support arms 96 of both center panels are of the same length, the center panels will move to the closed position in unison without a lag.

As shown schematically in FIG. 14, an endless member or cable 98 is dead ended on torque arm 97a. Cable 98 then passes to the end of header 4 where it is trained over a tension pulley 99 that is connected to the header through a spring loaded tensioning mechanism indicated generally by 100. Cable 98 then travels back toward the center of the header and over a pulley 101 and then downwardly around pulley 102 and is connected to the torque arm 97b. From torque arm 97b cable 98 passes to the opposite end of the header and is trained around a multiple-groove drive sheave 103 and idler sheave 104. Drive sheave 103 can be driven in a reversible manner by any conventional drive mechanism 105, such as that previously described.

Cable 98 then travels back toward the center of the header 4 around pulley 102 and downwardly around pulley 101 and is reattached to the torque arm 97b.

With this cable arrangement, operation of the drive 105 in one direction will move the torque arms 97a and 97b in a direction toward each other to move the panels to a closed position, while operation of the drive in the opposite direction will move the torque arm in the direction away from each other to move the panels to the open or folded condition, as illustrated in FIG. 15.

Figure 1:
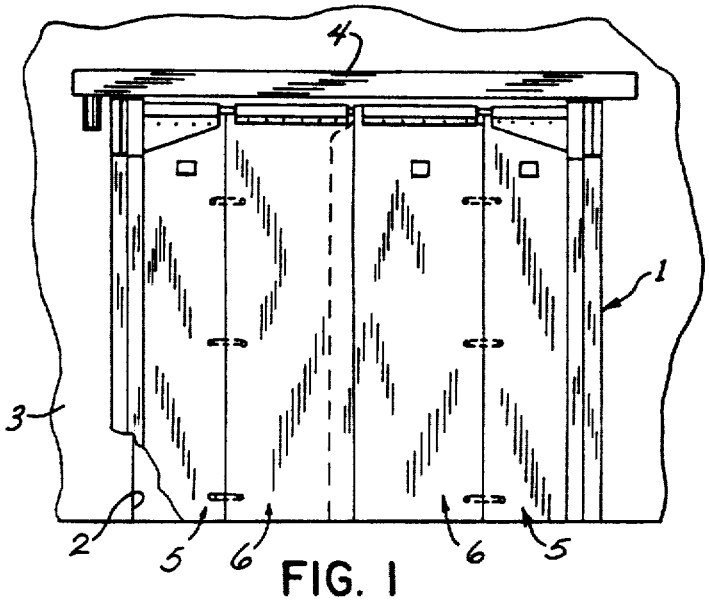
FIG. 1 is a front elevation of building incorporating the door of the invention which is shown in the closed position.

As the supporting arms 91 of both center panels 90 have substantially the same length, the center panels will move in unison to the closed position, without one center panel lagging behind the other. Thus, the drive mechanism, as shown in FIGS. 14–16, can be simplified over that of FIGS. 1–3.

While the description has shown the side and center panels being preferably fabricated from a transparent material so that traffic is visible through the panels, it is contemplated that in some installations the center panels may be made of transparent material while the side panels may be of opaque material. Alternately, the panels could be provided with transparent windows.

The door construction of the invention can be used in a wide variety of different applications and has a primary use in separating two areas of a building which may be operating under different temperature or humidity conditions. The door can also be employed to provide noise control between two areas of a plant.

In practice, the doors can be operated through induction loops on the floor which are actuated by material handling equipment moving across the floor, or alternately the drive mechanism can be operated by a pull cable, or can be radio controlled.

As the door panels are supported only from the top, the doors are less prone to damage by impact of material handling equipment, such as a fork lift truck. In addition, the weather sealing strips, such as 70 and 83, are designed such that the edges of the transparent sheets 9 and 18 will readily pull from the strips under heavy impact without damage to either the panels or the weather strips. The connection can be readily reestablished by merely inserting the edge of the sheets into the strips.

As the door is composed only of a pair of side panels and a pair of center panels, as opposed to a multiplicity of panels, a simpler construction is achieved which requires less maintenance.

The use of the torque arms, such as 33, 47 and 97, provide a mechanical advantage in pivoting the center panels between the open and closed positions and thus reduces the power requirements for operating the door.

Various modes of carrying out the invention are contemplated as being within the scope of the following claims particularly pointing out and distinctly claiming the subject matter which is regarded as the invention.

We claim:

1. An industrial door to enclose a doorway in a building, comprising a pair of side panels, means for pivotally connecting one side edge of each side panel to a side of the doorway, a pair of center panels, a side edge of each center panel being disposed adjacent a second side edge of a side panel, a track extending along the upper end of the doorway, a pair of trolley means disposed to ride on the track, the upper edge of each center panel being connected to one of said trolley means and mounted for rotation relative to said trolley means about a vertical pivot axis, drive means for moving said trolley means on said track and simultaneously pivoting said panels about the respective axes to thereby move the panels between a folded open position and a closed position where said panels enclose said doorway, said drive means comprising reversible power operated means and a cable operable connected to said power operating means, a torque arm extending outwardly from the axis of each trolley means, said cable being connected to each torque arm at a location spaced from the respective axis, each torque arm being generally quadrant-shaped and each torque arm including a curved surface, said cable disposed on said curved surface, said cable means being reeved to effect movement of said trolley means in opposite directions on said track and simultaneously pivot said torque arms about the respective axes to move the panels between the open and closed positions.

2. The door of claim 1, wherein said cable is disposed in endless form and is reeved to travel in a pair of generally parallel runs, said vertical axes being offset from said runs.

3. The door of claim 1, wherein each torque arm includes of three side edges, a pair of said side edges meeting at a corner and a third side edge connecting the ends of said pair of side edges and constituting said curved surface, said pivot axis being located adjacent said corner.

4. A bi-fold industrial door to enclose the doorway in a building, comprising a pair of side panels, means for connecting one side edge of each side panel to a side of the doorway, a pair of center panels, a side edge of each center panel being disposed adjacent a second side edge of the respective side panel, a track extending across the upper end of said doorway, a pair of trolleys disposed to ride on the track, the upper edge of each center panel being connected to one of said trolleys and mounted for rotation relative to the respective trolley about a vertical pivot axis, power operated drive means operably connected to each trolley at a location spaced from the respective pivot axis for moving the panels between a folded open position and a closed position where the panels enclose said doorway, and flexible weather strip means interconnecting the adjacent side edges of the side panels and center panels, said weather strip means including a pair of open ended elongated strips, and a flexible section connecting said strips together, the side edges of the respective side and center panels disposed within the open ends of said elongated strips.

5. The door of claim 4, and including a plurality of serrations disposed within the open ends of the strips to grip the respective panels.

6. A bi-fold industrial door to enclose the doorway in a building, comprising a pair of side panels, means for connecting one side edge of each side panel to a side of the doorway, a pair of center panels, a side edge of each center panel being disposed adjacent a second side edge of the respective side panel, a track extending across the upper end of said doorway, a pair of trolleys disposed to ride on the track, the upper edge of each center panel being connected to one of said trolleys and mounted for rotation relative to the respective trolley about a vertical pivot axis, power operated drive means operably connected to each trolley at a location spaced from the respective pivot axis for moving the panels between a folded open position and a closed position where the panels enclose said doorway, flexible weatherstrip means interconnecting the side edges of each side panel with the doorway, said weatherstrip means comprising an elongated connecting strip having a vertical groove to receive the side edge of the respective side panel, and a flexible section interconnecting the connecting strip with said doorway.

[7. In combination, a building having a doorway, said doorway being defined by a pair of vertical jambs and a horizontal header, a door to enclose the doorway and including a pair of side panels, means for pivotally connecting one side edge of each side panel to the respective jamb, a pair of center panels, a side edge of each center panel being disposed adjacent a second side edge of a respective side panel, means for moving said panels from a closed position wherein said panels extend across said doorway to close the same to a folded open position wherein each central panel is disposed substantially parallel to the respective side panel and is disposed generally flatwise against the respective jamb, resilient means interconnecting the adjacent side edge portions of said side panels and center panels for effecting proper folding of said side and center panels, said resilient means comprising a resilient cord connecting said adjacent side edge portions.]

[8. The combination of claim 7, wherein said adjacent side edge portions are provided with holes and said cord is disposed within said holes, the ends of said cord being provided with enlarged heads to retain said cord within said holes.]

9. An industrial door to enclose a doorway in a building, comprising a pair of side panels, means for pivotally connecting one side edge of each side panel to a side of the doorway, a pair of center panels, a side edge of each center panel being disposed adjacent a second side edge of the side panels, a track extending across the upper end of the doorway, a pair of trolley means disposed to ride on the track, the upper edge of each center panel being connected to one of said trolley means and mounted for rotation relative to said trolley means about a vertical pivot axis, a torque arm connected to each trolley means and pivotable about the respective axis, a flexible drive member mounted to travel in a path offset laterally from said track and connected to each torque arm at a location spaced from said axis, said torque arm being constructed and arranged so that a force applied to said torque arm through said flexible member will move said trolley means along said track and simultaneously pivot said torque arm to move said panels between the closed and open positions.

10. The door of claim 9, wherein said flexible member is a cable and said cable is attached to each torque arm at two separate locations spaced from said axes, whereby movement of said cable in one direction will pivot said torque arms about said axes to move said panels toward the open position and movement of said cable in the opposite direction will pivot said torque arms to move said panels to the closed position.

11. A bi-fold industrial door to enclose a doorway in a building, comprising a pair of side panels, means for pivotally connecting one side edge of each side panel to a side of the doorway, a pair of center panels, a side edge of each center panel being disposed adjacent to a second side edge of a respective side panels, a track extending across the upper end of said doorway, a pair of trolleys disposed to ride on the track, the upper edge of each center panel being connected to one of said trolleys and mounted for rotation relative to the respective trolley about a vertical pivot axis, power operated drive means including a flexible member interconnecting said power operated drive means and each trolley for moving the panels between an open folded position to a closed position where the panels enclose the doorway, a first of said center panels being constructed and arranged to move from the open to the closed position before a second of said center panels, and override means for operably disengaging the connection of said drive means to said first center panel after said first center panel is in the closed position while maintaining the connection of said drive means to the second center panel to thereby move said second panel to the closed position.

12. The combination of claim 11, and including stop means disposed to stop movement of the trolley means associated with said first center panel when said first center panel is in the closed position.

13. The door of claim 11, wherein said flexible member is an endless cable operably connected to said power operated means, said override means comprising tensioning means operably connected to said cable and constructed and arranged to take up slack in said cable.

14. The door of claim 13, wherein said tensioning means comprises a pair of pulleys, and resilient mounting means for mounting each pulley and exerting a tensioning force on the respective pulley, said tensioning forces acting in opposite directions.

15. The door of claim 14, wherein said tensioning forces act in a direction toward each other.

* * * * *